US008855366B2

(12) United States Patent
Wagner et al.

(10) Patent No.: US 8,855,366 B2
(45) Date of Patent: Oct. 7, 2014

(54) TRACKING THREE-DIMENSIONAL OBJECTS

(75) Inventors: Daniel Wagner, Vienna (AT); Michael Gervautz, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/450,241

(22) Filed: Apr. 18, 2012

(65) Prior Publication Data

US 2013/0136300 A1    May 30, 2013

Related U.S. Application Data

(60) Provisional application No. 61/564,722, filed on Nov. 29, 2011.

(51) Int. Cl.
*G06K 9/00*    (2006.01)

(52) U.S. Cl.
USPC ........................................................ 382/103

(58) Field of Classification Search
USPC ......... 348/169; 375/E7.11; 382/103; 701/519
See application file for complete search history.

(56) References Cited

U.S. PATENT DOCUMENTS

| 5,475,422 | A | * | 12/1995 | Mori et al. | ....................... 348/48 |
| 6,795,567 | B1 | | 9/2004 | Cham et al. | |
| 7,940,264 | B2 | | 5/2011 | Jojic et al. | |
| 2003/0235327 | A1 | * | 12/2003 | Srinivasa | ...................... 382/104 |
| 2007/0279494 | A1 | * | 12/2007 | Aman et al. | .................. 348/169 |
| 2008/0219504 | A1 | * | 9/2008 | Adams et al. | ................. 382/103 |
| 2010/0232727 | A1 | | 9/2010 | Engedal | |
| 2011/0123122 | A1 | | 5/2011 | Agrawal et al. | |
| 2011/0129118 | A1 | | 6/2011 | Hagbi et al. | |
| 2012/0224068 | A1 | | 9/2012 | Sweet, III | |

FOREIGN PATENT DOCUMENTS

| EP | 1594322 A2 | 11/2005 | |
| GB | 2325807 A | 12/1998 | |
| KR | 20010055957 A | * 7/2001 | ............... H04N 7/18 |

OTHER PUBLICATIONS

International Search Report and Written Opinion—PCT/US2012/066114—ISA/EPO—Feb. 21, 2013.
Wagner D et al., "Robust and Unobtrusive Marker Tracking on Mobile Phones", Mixed and Augmented Reality, 2008, ISMAR 2008. 7Th IEEE/ACM International Symposium on, IEEE, Piscataway, NJ, USA, Sep. 15, 2008, pp. 121-124, XP031343986.
Hinterstoisser et al., "Dominant Orientation Templates for Real-Time Detection of Texture-Less Objects," IEEE Computer Society Conference on Computer Vision and Pattern Recognition (CVPR), San Francisco, California (USA), Jun. 2010, pp. 1-8.

* cited by examiner

*Primary Examiner* — Gregory F Cunningham
(74) *Attorney, Agent, or Firm* — Silicon Valley Patent Group LLP

(57) ABSTRACT

Method and apparatus for tracking three-dimensional (3D) objects are disclosed. In one embodiment, a method of tracking a 3D object includes constructing a database to store a set of two-dimensional (2D) images of the 3D object using a tracking background, where the tracking background includes at least one known pattern, receiving a tracking image, determining whether the tracking image matches at least one image in the database in accordance with feature points of the tracking image, and providing information about the tracking image in respond to the tracking image matches the at least one image in the database. The method of constructing a database also includes capturing the set of 2D images of the 3D object with the tracking background, extracting a set of feature points from each 2D image, and storing the set of feature points in the database.

32 Claims, 4 Drawing Sheets

TRACKING THREE-DIMENSIONAL OBJECTS

CROSS REFERENCE TO RELATED APPLICATIONS

This application claims the benefit of U.S. provisional application No. 61/564,722, "Tracking Three-Dimensional Objects" filed Nov. 29, 2011. The aforementioned United States application is hereby incorporated by reference in its entirety.

FIELD

The present disclosure relates to the field of processing digital image data. In particular, the present disclosure relates to tracking three-dimensional objects.

BACKGROUND

Conventional model based object tracking is limited to methods that assume exact knowledge about the geometric properties of the object. Often this restriction limits model based tracking to planar objects, where the geometric properties of the object are trivial. This limitation presents challenges in tracking natural three-dimensional (3D) objects that are usually more complex than simple objects, such as posters and product packages. In many cases, virtual models do not exist and typical conventional model acquisition processes for such natural 3D objects can be prohibitively complicated. For example, one conventional approach is to use a three dimensional scanner to scan natural objects. However, this approach may be tedious, cost intensive, and may require special skill in 3D modeling. As a result, the conventional approach may be too expensive and too complex to be deployed to the mass market.

Therefore, there is a need for apparatus and method of tracking 3D objects that can address the above issues of conventional solutions.

SUMMARY

The present disclosure relates to tracking three dimensional objects. According to embodiments of the present disclosure, a method of tracking a three-dimensional (3D) object includes constructing a database to store a set of two-dimensional (2D) images of the 3D object using a tracking background, where the tracking background includes at least one known pattern, receiving a tracking image, determining whether the tracking image matches at least one image in the database in accordance with feature points of the tracking image, and providing information about the tracking image in respond to the tracking image matches at least one image in the database.

The method of constructing a database also includes capturing the set of 2D images of the 3D object with the tracking background, where the set of 2D images includes a plurality of viewing angles of the 3D object, extracting a set of feature points from each 2D image, where the set of feature points include a first subset of feature points of the 3D object and a second subset of feature points of the tracking background, and storing the first sub-set of feature points in the database. The method of constructing a database further includes recording corresponding pose information of the set of 2D images with respect to a common coordinate system defined by the pattern of the background target, and storing the set of feature points in the database.

The method of determining whether the tracking image matches at least one image in the database includes extracting feature points from the tracking image, and comparing the feature points of the tracking image to corresponding feature points of the set of 2D images in the database. The method of comparing the feature points of the tracking image to corresponding feature points of the set of 2D images in the database includes performing an accumulated vote on number of matched feature points between the tracking image and the set of 2D images in the database, and identifying at least one representative image from the set of 2D images in accordance with the accumulated vote on number of matched feature points. The method of comparing the feature points of the tracking image to corresponding feature points of the set of 2D images in the database further includes estimating a representative pose of the tracking image from the at least one representative image that has a highest number of matched feature points. The method of comparing the feature points of the tracking image to corresponding feature points of the set of 2D images in the database further includes creating a set of merged feature points by merging features points from two or more of the representative images, and estimating a representative pose of the tracking image in accordance with the set of merged feature points.

The method of providing information about the tracking image includes at least one of providing pose information of the tracking image received, providing information to support animation applications on the mobile device according to the pose information of the tracking image, and providing information to support augmented reality applications on the mobile device according to the pose information of the tracking image.

In another embodiment, a computer program product for tracking a three-dimensional object comprises a non-transitory medium storing computer programs for execution by one or more computer systems. The computer program product further comprises code for constructing a database to store a set of two-dimensional (2D) images of the 3D object using a tracking background, where the tracking background includes at least one known pattern, code for receiving a tracking image, code for determining whether the tracking image matches at least one image in the database in accordance with feature points of the tracking image, and code for providing information about the tracking image in respond to the tracking image matches at least one image in the database.

In yet another embodiment, a mobile device comprises at least one processor configured to control operations of the mobile device and a 3D object tracking module configured to work with the at least one processor. The 3D object tracking module includes logic configured to construct a database to store a set of two-dimensional (2D) images of the 3D object using a tracking background, where the tracking background includes at least one known pattern, logic configured to receive a tracking image, logic configured to determine whether the tracking image matches at least one image in the database in accordance with feature points of the tracking image, and logic configured to provide information about the tracking image in respond to the tracking image matches at least one image in the database.

In yet another embodiment, an apparatus comprises at least one processor configured to control operations of the apparatus, and a 3D object tracking module configured to work with the at least one processor. The 3D object tracking module includes means for constructing a database to store a set of two-dimensional (2D) images of the 3D object using a tracking background, where the tracking background includes at least one known pattern, means for receiving a tracking image, means for determining whether the tracking image matches at least one image in the database in accordance with feature points of the tracking image, and means for providing information about the tracking image in respond to the tracking image matches at least one image in the database.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

DESCRIPTION OF EMBODIMENTS

Embodiments of tracking 3D objects are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Figure 1:
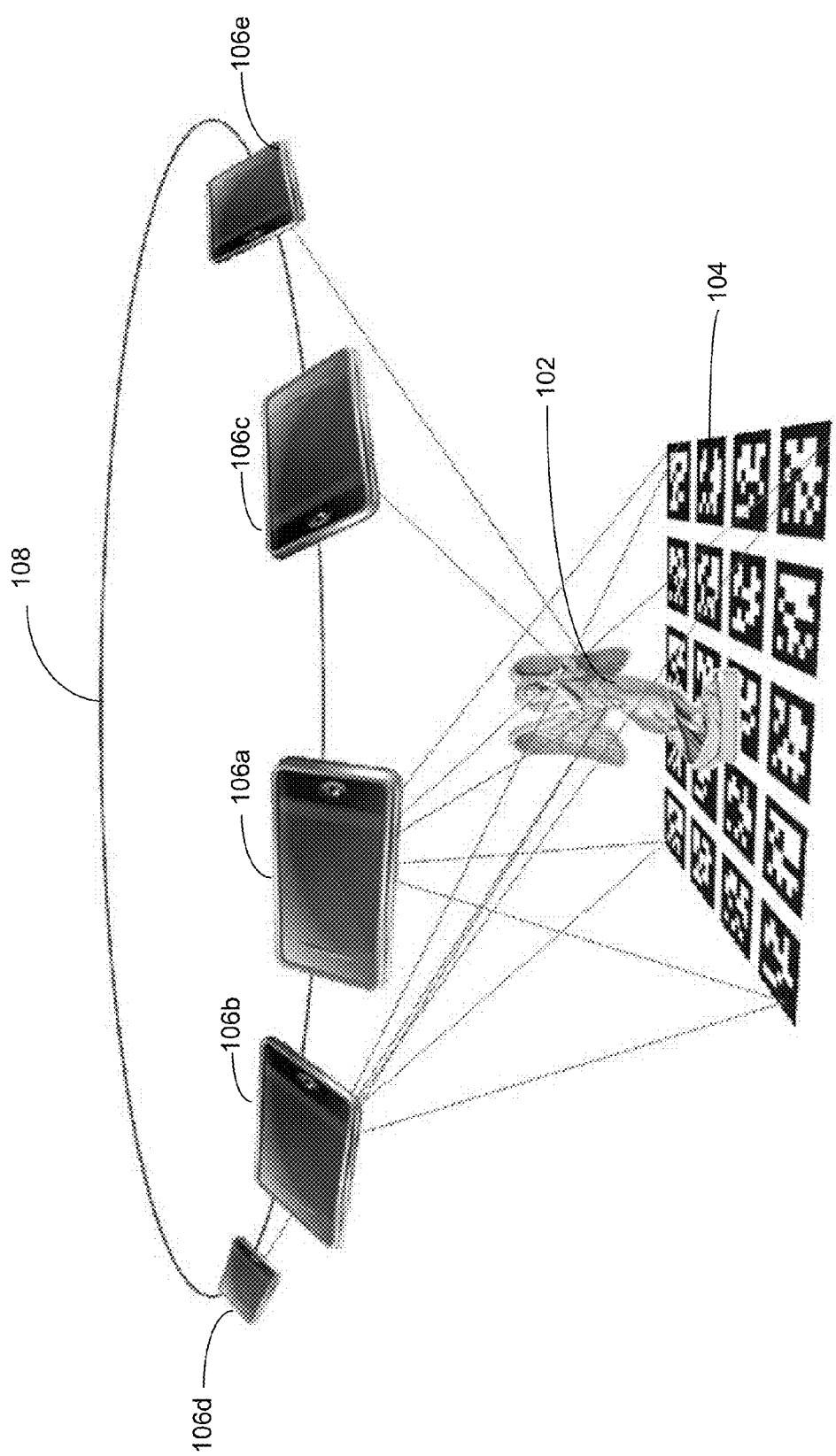
FIG. 1 illustrates a method of acquiring image models of an object according to some aspects of the present disclosure.

FIG. 1 illustrates a method of acquiring image models of an object according to some aspects of the present disclosure. In this example, a statue 102 is a three-dimensional (3D) object to be tracked. The statue 102 is placed against a tracking background 104, where the tracking background may include at least one known pattern. Photos images taken from different viewing directions may be captured by a mobile device, represented by 106a-106d, for tracking of the statue 102. The oval 108 indicates that multiple photo images may be captured to form a set of two-dimensional (2D) images of the statue 102. In one approach, a photo may be taken with 10 degrees of viewing angle separation. In other approaches, a photo may be taken with 5, 15, 20 or 60 degrees of viewing angle separation, based on the feature descriptor and detection method used for feature detection. In other embodiments, the model acquisition process may be performed offline, independent of the device and software that is used for tracking. Many different devices may be used to capture the photo images, including but not limited to, photo camera, camera phone, web cam, and other image capturing devices.

As shown in FIG. 1, the tracking background 104 may be a marker board or an image that includes at least one known pattern. Such predetermined known patterns can be used to determine the camera position relative to the background. In this approach, since the relative position of the statue and the marker board is fixed, a series of registered images of the statue may be obtained. The known tracking background further allows segmenting the foreground (i.e. the statue) from the background (i.e. the marker board) in this example. Note that in this example, the tracking background includes twenty (4×5) unique marker. In other implementations, a different tracking background may be employed, such as a picture or a 20×20 marker board to allow robust and accurate pose estimation in situation where a large number of markers may be occluded. In other approaches, the photo images may be taken from a static device and the tracking background 104 and the statue 102 can be controlled using a turntable. In another approach, the overlapping regions in the pictures may be used to create a 3D geometric model of the foreground object. In yet another approach, one may use a combined color and depth camera or an RGBD (red green blue and depth) acquisition device that provides additional geometric information for feature points as well as foreground segmentation.

According to embodiments of the present disclosure, the model acquisition can be performed by users who may not have been trained in 3D modeling or computer vision. The mobile device 106a may be a mobile phone with a camera, where the camera may be calibrated with data provided by mobile phone manufacturer or by any other calibration method or any other device that is able to take photos. After a set of 2D images (also referred to as reference images) of the statue 102 has been captured by the mobile device 106a, these images are used to create a database (not shown) for supporting subsequent tracking of the statue 102, and for providing other useful information and applications related to the statue. In addition, using the tracking background 104 embedded in the set of 2D images stored in the database, the pose including position and orientation, of each of these images relative to the object may be determined. Additionally, known tracking backgrounds may be used for segmentation (distinguishing an object from a background).

As illustrated in the example above, instead of working with a detailed, textured 3D model of a target object as in conventional methods, the disclosed approach uses multiple planar models that represent the target object from various view points. In each view, the feature points are arranged in a 3D plane that is representative for the 3D object as seen from that view point. One approach places this plane at the center of the 3D object and orients it perpendicular to the viewing direction of the camera for this view. Another approach places the plane at the center of the background target and orients it upright and facing the camera for that view. Since the 3D object being tracked may be relatively small compared to the viewing distance of the tracking image, the planar approximation holds.

Estimating the camera pose from the tracking image uses the correspondences found in the matching step between the 2D features in the tracking image and the 3D features in the database. Even though the database view closest to the current camera position of the tracking image represents the 3D object the best, the quality of the estimated pose can be further improved by considering feature correspondences from neighboring views as well.

As described above, the database stores multiple planar images that depict an object seen from many different viewing directions of interest. Hence, the dataset size may grow linearly with the number of viewing directions. To limit the number of reference images, the angle between two neighboring reference viewpoints, for example between 15°-30°, may be chosen based on the shape of the object so that successful detection and tracking may still be accomplished. In addition, instead of storing actual images of the object, feature points that represent each of the image may be stored.

According to embodiments of the present disclosure, the method compares feature points from a tracking image captured by a mobile device (equipped with a camera) against the feature points of the set of reference images in the database. A voting process may be employed to a representative reference view that may have a highest absolute or relative (normalized by the number of feature in the database for that view) number of feature points that match the corresponding feature points of the tracking image. The representative view may then be used for pose estimation.

Figure 2A:
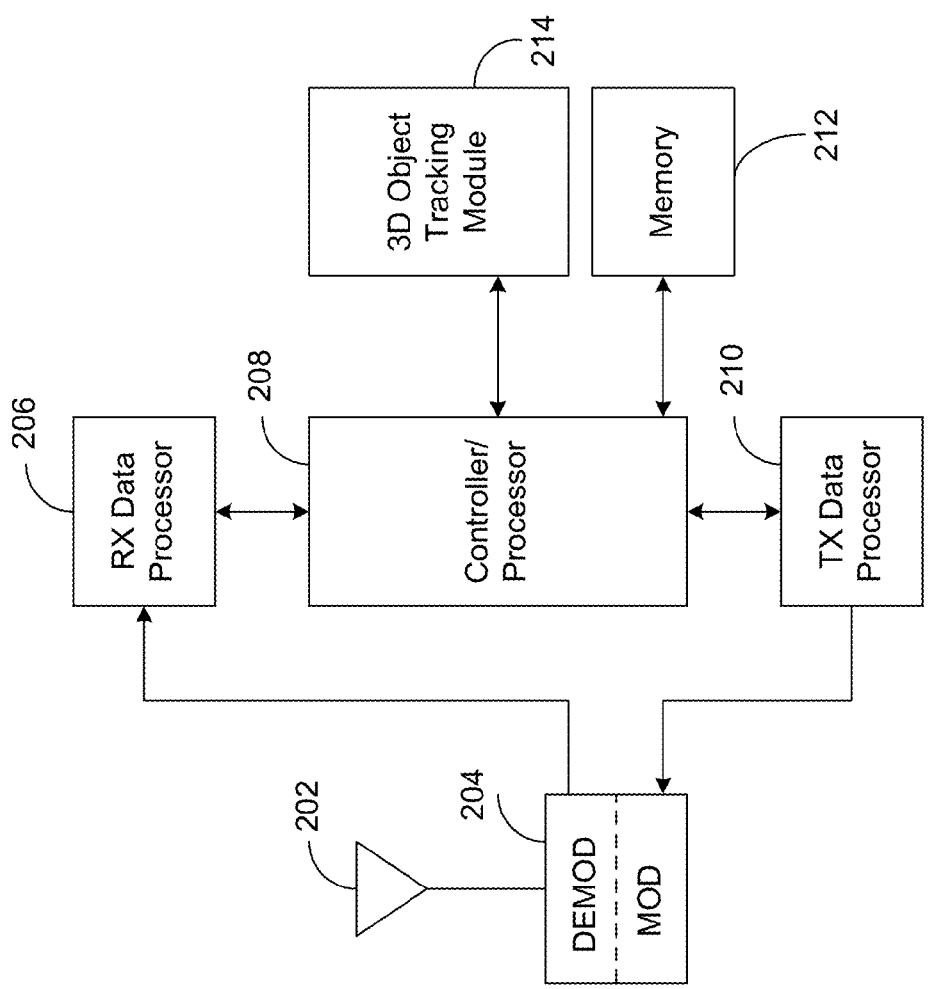
FIG. 2a illustrates a block diagram of an apparatus configured to perform image object tracking according to some aspects of the present disclosure.

FIG. 2a illustrates a block diagram of an apparatus configured to perform image object tracking according to some aspects of the present disclosure. As shown in FIG. 2a, antenna 202 receives modulated signals from a base station and provides the received signals to a demodulator (DE-MOD) part of a modem 204. The demodulator processes (e.g., conditions and digitizes) the received signal and obtains input samples. It further performs orthogonal frequency-division multiplexing (OFDM) demodulation on the input samples and provides frequency-domain received symbols for all subcarriers. An RX data processor 206 processes (e.g., symbol de-maps, de-interleaves, and decodes) the frequency-domain received symbols and provides decoded data to a controller/processor 208 of the mobile device.

The controller/processor 208 can be configured to control the mobile device to communicate with a server via a wireless network. A TX data processor 210 generates signaling symbols, data symbols, and pilot symbols, which can be processed by modulator (MOD) of modem 204 and transmitted via the antenna 202 to a base station. In addition, the controller/processor 208 directs the operation of various processing units at the mobile device. Memory 212 can be configured to store program codes and data for the mobile device. 3D object tracking module 214 can be configured to capture and store models of an object in a database and detecting tracking images of an object using the database.

Figure 2B:
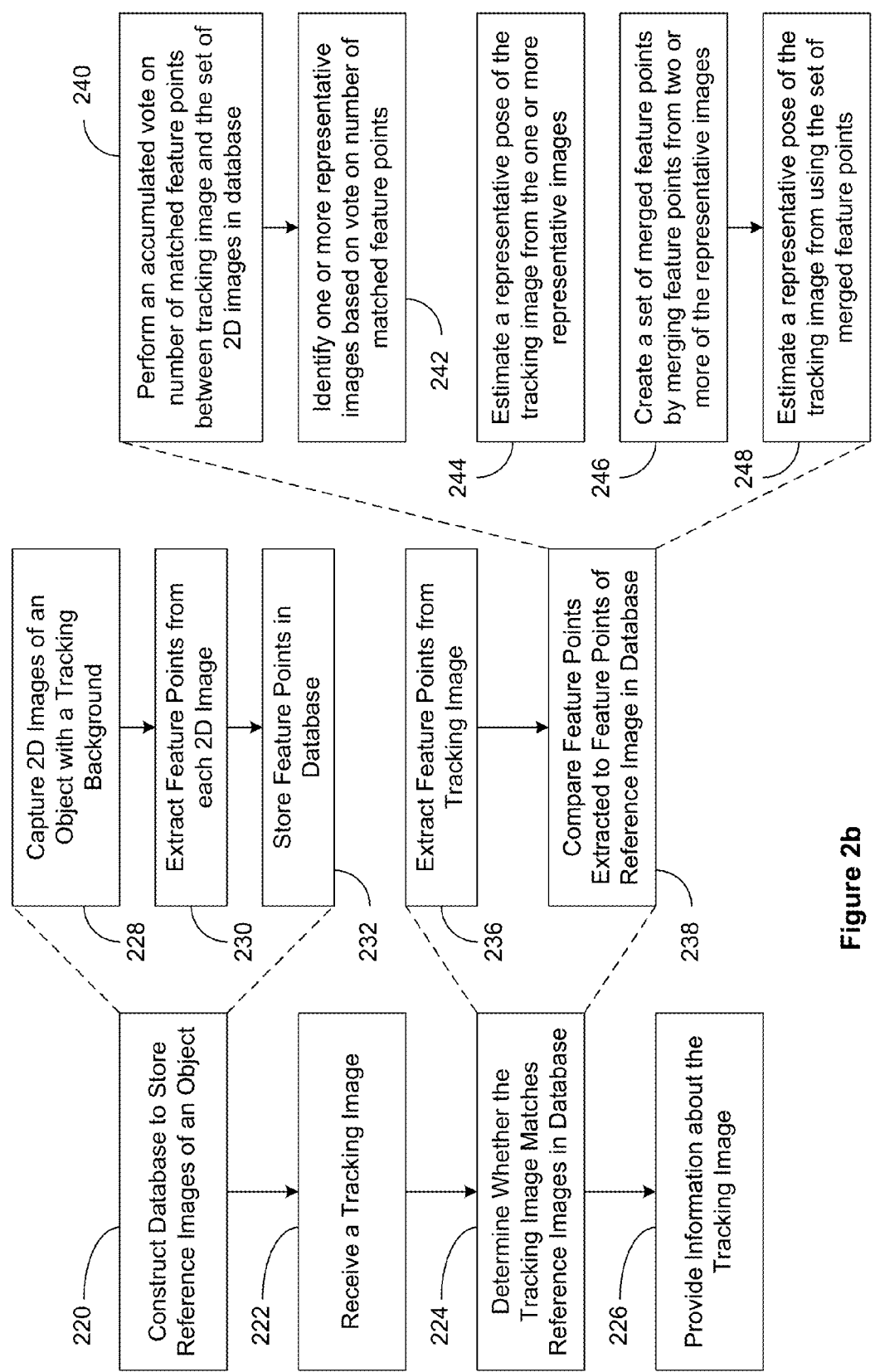
FIG. 2b illustrates an exemplary flow chart implemented by the 3D object tracking module of FIG. 2a according to some aspects of the present disclosure.

FIG. 2b illustrates an exemplary flow chart implemented by the 3D object tracking module of FIG. 2a according to some aspects of the present disclosure. In block 220, the object tracking module 214 can be configured to construct a database to store a set of two-dimensional (2D) images of an object with respect to a tracking background. In block 222, the object tracking module 214 can be configured to receive a tracking image from a mobile device. In block 224, the object tracking module 214 can be configured to determine whether the tracking image matches at least one image in the database in accordance with feature points of the tracking image. In block 226, the object tracking module 214 can be configured to provide information about the tracking image in respond to the tracking image matches at least one image in the database. Note that the object may be a three-dimensional object, and the tracking background may include at least one known pattern. Note that after the database is created in block 220, the methods described in blocks 222 to 226 may be employed repeatedly to track an object using the database. In some implementations, methods described in each of the blocks of FIG. 2b may be performed independently and repeatedly with respect to other blocks. For example, methods described in block 220 may be performed independently to update the set of images and their corresponding feature points stored in the database. Methods described in block 222 may be performed repeatedly to capture a better quality tracking image. Methods described in block 226 may be performed multiple times to provide information related to the tracking image.

According to embodiments of the present disclosure, the methods performed in block 220 may further include methods performed in blocks 228-232. For example, in block 228, the object tracking module 214 can be configured to capture the set of 2D images of the object with the tracking background, where the set of 2D images includes a plurality of viewing angles of the object. In block 230, the object tracking module 214 can be configured to extract a set of feature points from each 2D image, where the set of feature points include a first subset of feature points of the object and a second subset of feature points of the tracking background. In block 230, the object tracking module 214 can be configured to store the first sub-set of feature points in the database.

According to embodiments of the present disclosure, the methods performed in block 224 may further include methods performed in blocks 236-238. In the example shown in FIG. 2b, in block 236, the object tracking module 214 can be configured to extract feature points from the tracking image. In block 238, the object tracking module 214 can be configured to compare the feature points of the tracking image to corresponding feature points of the set of 2D images in the database.

According to embodiments of the present disclosure, the methods performed in block 238 may further include methods performed in block 240 to block 248. In this example, in block 240 and block 242, the object tracking module 214 can be configured to perform an accumulated vote on number of matched feature points between the tracking image and the set of 2D images in the database, and identify at least one representative image from the set of 2D images in accordance with the accumulated vote on number of matched feature points, respectively. In block 244, the object tracking module 214 can be configured to estimate a representative pose of the tracking image from the at least one representative image that has a highest number of matched feature points. In block 246 and block 248, the object tracking module 214 can be configured to create a set of merged feature points by merging features points from two or more of the representative images, and estimate a representative pose of the tracking image in accordance with the set of merged feature points, respectively.

According to embodiments of the present disclosure, in block 226, the object tracking module 214 can be configured to provide at least one of the following, including but not limited to, pose information of the tracking image received, a relative position of the mobile device with respect to the tracking background, information to support animation applications on the mobile device, and/or information to support augmented reality applications on the mobile device.

Figure 3:
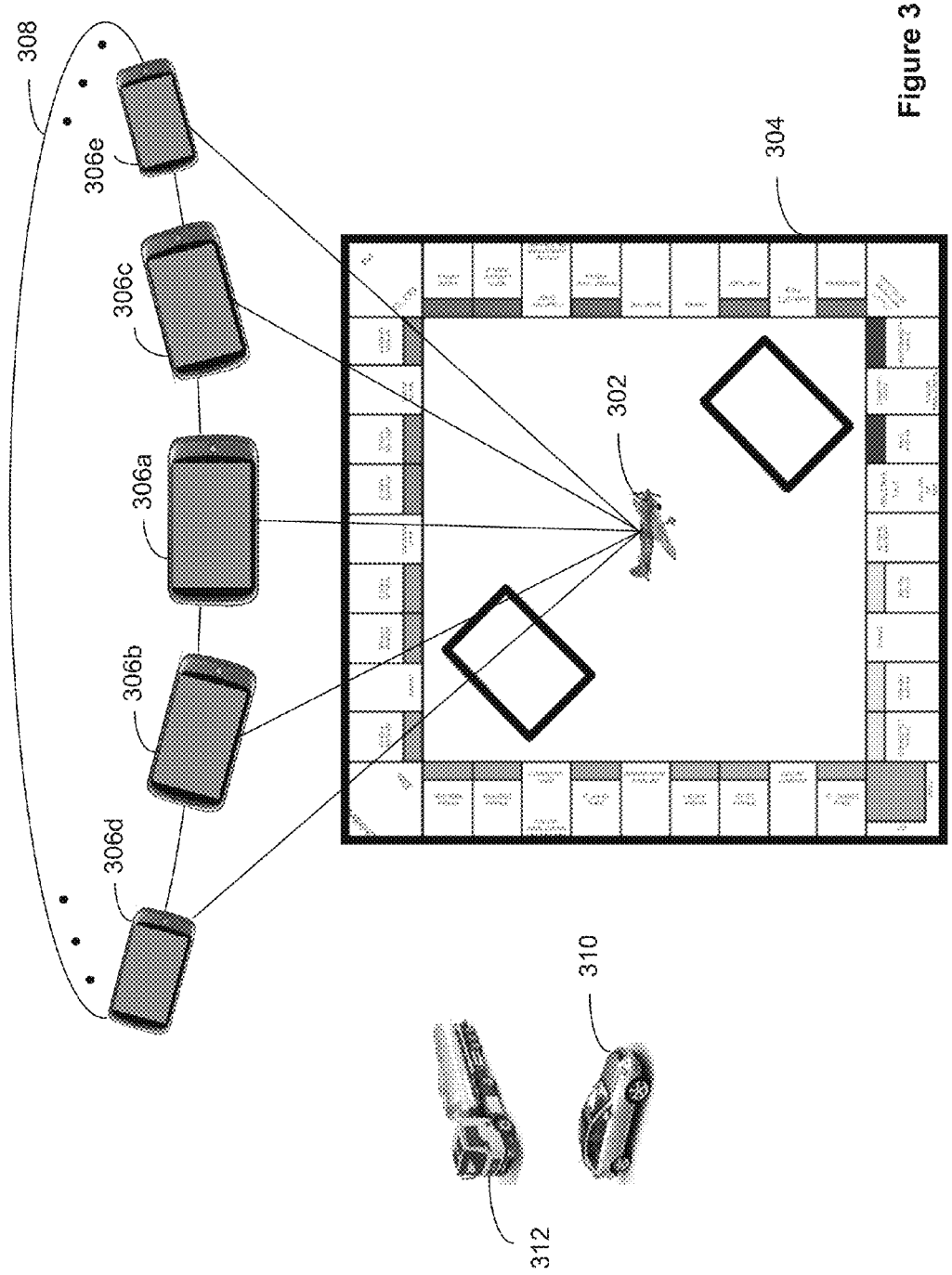
FIG. 3 illustrates another method of tracking 3D objects according to some aspects of the present disclosure.

FIG. 3 illustrates an exemplary use of the described tracking method according to aspects of the present disclosure. As shown in FIG. 3, a toy plane 302, or toy cars (310, 312) may be used as game pieces on a game board (304). The 3D game pieces are represented by a set of images, as described before (306a-306e) taken from each of the game pieces. The disclosed method of tracking/detection of the game-board allows game developers to know where the game board may be located and where each of the game pieces may be located relative to the game board.

According to embodiments of the present disclosure, after having generated the database, the plane 302 can be moved onto any position on the game board and can be tracked there. In other words, the method can find out where the plane 302 is on the game board and in which direction it may be heading. Note that during authoring, the dataset for the plane may be generated independent of the game-board. The game-board may be used to have the images of the plane registered to each other, but not necessary relative to a fixed position on the game board. Later in a game, if a player wants to know where the plane is relative to the game board (on which field the player has placed the plane), the game-board (as an image object) may be tracked as well as the plane (as a 3D object) relative to the camera, and in this way location of the plane may be determined relative to the game-board.

According to embodiments of the present disclosure, the range of objects that can be tracked by the disclosed methods has been extended to include classes of objects having structured and/or irregular surfaces. In addition, representation of an object being tracked may be independent of the complexity of the object, as similar methodologies may be applied to track different objects. This is particularly useful for objects that are hard to represent, such as natural trees, bushes, fur, hair, and structured surfaces. The amount of memory usage can be estimated as it relates to a fixed number of images from different views. Moreover, the model construction process may be performed by a user, without special equipment or training in computer graphics. With the disclosed methods, a user may "scan" an object with a set of photo images taken from different views, and use the photo images in applications, such as augmented reality applications, that require tracking of image objects.

Note that paragraphs [0036]-[0038], FIG. 1, FIGS. 2a-2b and their corresponding descriptions provide means for constructing a database to store a set of two-dimensional (2D) images of the 3D object using a tracking background, means for receiving a tracking image, means for determining whether the tracking image matches at least one image in the database in accordance with feature points of the tracking image, and means for providing information about the tracking image in respond to the tracking image matches at least one image in the database. Paragraphs [0036]-[0038], FIG. 1, FIG. 2b, FIG. 3 and their corresponding descriptions further provide means for capturing the set of 2D images of the 3D object with the tracking background, means for extracting a set of feature points from each 2D image, and means for storing the set of feature points in the database; means for recording corresponding pose information of the set of 2D images with respect to a common coordinate system, and means for storing the set of feature points in the database. Paragraphs [0036]-[0038], FIG. 1, FIG. 2b, FIG. 3 and their corresponding descriptions further provide means for extracting feature points from the tracking image, and means for comparing the feature points of the tracking image to corresponding feature points of the set of 2D images in the database; means for performing an accumulated vote on number of matched feature points between the tracking image and the set of 2D images in the database, and means for identifying at least one representative image from the set of 2D images in accordance with the accumulated vote on number of matched feature points; and means for estimating a representative pose of the tracking image from the at least one representative image that has a highest number of matched feature points.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of tracking a three-dimensional (3D) object, comprising:
receiving a tracking image of the 3D object at a mobile device;
extracting feature points of the tracking image of the 3D object;
comparing the feature points of the tracking image of the 3D object to a database, wherein the database includes feature points of a set of two-dimensional (2D) images of the 3D object with a tracking background, wherein the tracking background includes at least one known pattern;
determining whether the feature points of the tracking image match features points of one or more images in the set of 2D images in the database; and
providing information about the tracking image in a display of the mobile device in response to a determination of the feature points of the tracking image match the feature points of the one or more images in the set of 2D images in the database.

2. The method of claim 1, wherein the database is constructed by:
capturing the set of 2D images of the 3D object with the tracking background, wherein the set of 2D images includes a plurality of viewing angles of the 3D object;
extracting a set of feature points from each 2D image, wherein the set of feature points include a first subset of feature points of the 3D object and a second subset of feature points of the tracking background; and
storing the set of feature points in the database.

3. The method of claim 2, further comprises:
recording corresponding pose information of the set of 2D images with respect to a common coordinate system; and
storing the set of feature points in the database.

4. The method of claim 1, wherein comparing the feature points of the tracking image of the 3D object to the database comprises:
performing an accumulated vote on number of matched feature points between the tracking image and the set of 2D images in the database; and
identifying at least one representative image from the set of 2D images in accordance with the accumulated vote on number of matched feature points.

5. The method of claim 4, wherein comparing the feature points of the tracking image of the 3D object to the database further comprises:
estimating a representative pose of the tracking image from the at least one representative image that has a highest number of matched feature points.

6. The method of claim 4, wherein comparing the feature points of the tracking image of the 3D object to the database further comprises:
creating a set of merged feature points by merging features points from two or more of the representative images; and
estimating a representative pose of the tracking image in accordance with the set of merged feature points.

7. The method of claim 1, wherein providing information about the tracking image comprises:
providing pose information of the tracking image received.

8. The method of claim 7, wherein providing information about the tracking image further comprises:
providing information to support animation applications on a mobile device according to the pose information of the tracking image.

9. The method of claim 7, wherein providing information about the tracking image further comprises:
providing information to support augmented reality applications on a mobile device according to the pose information of the tracking image.

10. A computer program product for tracking a three-dimensional (3D) object, comprising a non-transitory medium storing computer programs for execution by one or more computer systems, the computer program product comprising:

code for receiving a tracking image of the 3D object at a mobile device;

code for extracting feature points of the tracking image of the 3D object;

code for comparing the feature points of the tracking image of the 3D object to a database, wherein the database includes feature points of a set of two-dimensional (2D) images of the 3D object with a tracking background, wherein the tracking background includes at least one known pattern;

code for determining whether the feature points of the tracking image match features points of one or more images in the set of 2D images in the database; and code for providing information about the tracking image in a display of the mobile device in response to a determination of the feature points of the tracking image match the feature points of the one or more images in the set of 2D images in the database.

11. The computer program product of claim 10, wherein the database is constructed by:

code for capturing the set of 2D images of the 3D object with the tracking background, wherein the set of 2D images includes a plurality of viewing angles of the 3D object;

code for extracting a set of feature points from each 2D image, wherein the set of feature points include a first subset of feature points of the 3D object and a second subset of feature points of the tracking background; and code for storing the set of feature points in the database.

12. The computer program product of claim 11, further comprises:

code for recording corresponding pose information of the set of 2D images with respect to a common coordinate system; and code for storing the set of feature points in the database.

13. The computer program product of claim 10, wherein code for comparing the feature points of the tracking image of the 3D object to the database comprises:

code for performing an accumulated vote on number of matched feature points between the tracking image and the set of 2D images in the database; and code for identifying at least one representative image from the set of 2D images in accordance with the accumulated vote on number of matched feature points.

14. The computer program product of claim 13, wherein code for comparing the feature points of the tracking image of the 3D object to the database further comprises:

code for estimating a representative pose of the tracking image from the at least one representative image that has a highest number of matched feature points.

15. The computer program product of claim 13, wherein code for comparing the feature points of the tracking image of the 3D object to the database further comprises:

code for creating a set of merged feature points by merging features points from two or more of the representative images; and code for estimating a representative pose of the tracking image in accordance with the set of merged feature points.

16. The computer program product of claim 10, wherein code for providing information about the tracking image comprises:

code for providing pose information of the tracking image received.

17. The computer program product of claim 16, wherein code for providing information about the tracking image further comprises:

code for providing information to support animation applications on a mobile device according to the pose information of the tracking image.

18. The computer program product of claim 16, wherein code for providing information about the tracking image further comprises:

code for providing information to support augmented reality applications on a mobile device according to the pose information of the tracking image.

19. A mobile device, comprising:

at least one processor configured to control operations of the mobile device; and a 3D object tracking module configured to work with the at least one processor, wherein the 3D object tracking module includes:

logic configured to receive a tracking image of the 3D object at the mobile device;

logic configured to extract feature points of the tracking image of the 3D object;

logic configured to compare the feature points of the tracking image of the 3D object to a database, wherein the database includes feature points of a set of two-dimensional (2D) images of the 3D object with a tracking background, wherein the tracking background includes at least one known pattern;

logic configured to determine whether the feature points of the tracking image match features points of one or more images in the set of 2D images in the database; and logic configured to provide information about the tracking image in a display of the mobile device in response to a determination of the feature points of the tracking image match the feature points of the one or more images in the set of 2D images in the database.

20. The mobile device of claim 19, wherein the database is constructed by:

logic configured to capture the set of 2D images of the 3D object with the tracking background, wherein the set of 2D images includes a plurality of viewing angles of the 3D object;

logic configured to extract a set of feature points from each 2D image, wherein the set of feature points include a first subset of feature points of the 3D object and a second subset of feature points of the tracking background; and logic configured to store the set of feature points in the database.

21. The mobile device of claim 20, further comprises:

logic configured to recording corresponding pose information of the set of 2D images with respect to a common coordinate system; and logic configured to storing the set of feature points in the database.

22. The mobile device of claim 19, wherein logic configured to compare the feature points of the tracking image of the 3D object to the database comprises:

logic configured to perform an accumulated vote on number of matched feature points between the tracking image and the set of 2D images in the database; and logic configured to identify at least one representative image from the set of 2D images in accordance with the accumulated vote on number of matched feature points.

23. The mobile device of claim 22, wherein logic configured to compare the feature points of the tracking image of the 3D object to the database further comprises:

logic configured to estimate a representative pose of the tracking image from the at least one representative image that has a highest number of matched feature points.

24. The mobile device of claim 22, wherein logic configured to compare the feature points of the tracking image of the 3D object to the database further comprises:
   logic configured to create a set of merged feature points by merging features points from two or more of the representative images; and
   logic configured to estimate a representative pose of the tracking image in accordance with the set of merged feature points.

25. The mobile device of claim 19, wherein logic configured to provide information about the tracking image comprises:
   logic configured to provide pose information of the tracking image received.

26. The mobile device of claim 25, wherein logic configured to provide information about the tracking image further comprises:
   logic configured to provide information to support animation applications on the mobile device according to the pose information of the tracking image.

27. The mobile device of claim 25, wherein logic configured to provide information about the tracking image further comprises:
   logic configured to provide information to support augmented reality applications on the mobile device according to the pose information of the tracking image.

28. An apparatus, comprising:
   at least one processor configured to control operations of the apparatus; and
   a 3D object tracking module configured to work with the at least one processor, wherein the 3D object tracking module includes:
   means for receiving a tracking image of the 3D object at the apparatus;
   means for extracting feature points of the tracking image of the 3D object;
   means for comparing the feature points of the tracking image of the 3D object to a database, wherein the database includes feature points of a set of two-dimensional (2D) images of the 3D object with a tracking background, wherein the tracking background includes at least one known pattern;
   means for determining whether the feature points of the tracking image match features points of one or more images in the set of 2D images in the database; and
   means for providing information about the tracking image in a display of the apparatus in response to a determination of the feature points of the tracking image match the feature points of the one or more images in the set of 2D images in the database.

29. The apparatus of claim 28, wherein the database is constructed by:
   means for capturing the set of 2D images of the 3D object with the tracking background, wherein the set of 2D images includes a plurality of viewing angles of the 3D object;
   means for extracting a set of feature points from each 2D image, wherein the set of feature points include a first subset of feature points of the 3D object and a second subset of feature points of the tracking background; and
   means for storing the set of feature points in the database.

30. The apparatus of claim 29, further comprises:
   means for recording corresponding pose information of the set of 2D images with respect to a common coordinate system; and
   means for storing the set of feature points in the database.

31. The apparatus of claim 28, wherein means for comparing the feature points of the tracking image of the 3D object to the database comprises:
   means for performing an accumulated vote on number of matched feature points between the tracking image and the set of 2D images in the database; and
   means for identifying at least one representative image from the set of 2D images in accordance with the accumulated vote on number of matched feature points.

32. The apparatus of claim 31, wherein means for comparing the feature points of the tracking image of the 3D object to the database further comprises:
   means for estimating a representative pose of the tracking image from the at least one representative image that has a highest number of matched feature points.

* * * * *